United States Patent
Kremin (10) Patent No.: US 7,453,230 B1
(45) Date of Patent: Nov. 18, 2008

(54) SYNCHRONIZATION CIRCUIT AND METHOD OF PERFORMING SYNCHRONIZATION

(75) Inventor: Viktor Kremin, Lviv (UA)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 11/541,128

(22) Filed: Sep. 29, 2006

(51) Int. Cl.
*G05B 19/40* (2006.01)
(52) U.S. Cl. ...................... 318/685; 318/696
(58) Field of Classification Search .......... 318/696, 318/162, 685
See application file for complete search history.

(56) References Cited

U.S. PATENT DOCUMENTS

| | | | | |
|---|---|---|---|---|
| 4,851,755 A | * | 7/1989 | Fincher | 318/696 |
| 4,884,016 A | * | 11/1989 | Aiello | 318/685 |
| 5,973,469 A | * | 10/1999 | Higuchi et al. | 318/623 |
| 6,586,898 B2 | * | 7/2003 | King et al. | 318/254 |
| 6,815,923 B2 | * | 11/2004 | Forsey | 318/685 |
| 6,861,817 B2 | * | 3/2005 | Pigott et al. | 318/685 |
| 7,224,140 B2 | * | 5/2007 | Arefeen et al. | 318/685 |
| 7,239,108 B2 | * | 7/2007 | Best | 318/685 |
| 7,256,384 B2 | * | 8/2007 | Gottesman et al. | 250/214 C |
| 2002/0180396 A1 | * | 12/2002 | Yamaya | 318/685 |
| 2004/0032231 A1 | * | 2/2004 | Ellerthorpe et al. | 318/254 |
| 2004/0189237 A1 | * | 9/2004 | Mamyoda | 318/685 |

* cited by examiner

*Primary Examiner*—Lincoln Donovan
*Assistant Examiner*—Antony M. Paul (57) ABSTRACT

The circuit comprises a pulse width modulated (PWM) input signal, a resistor, an instrumentation amplifier, a filter and an analog to digital converter. The method of performing synchronization comprises sampling an analog signal and forming a digital data stream representing the signal, filtering the data stream to remove harmonics, measuring an approximate level of ripple in the data stream, detecting a change in the level of ripple, and based upon change in the level of ripple, determining if a stall has occurred.

21 Claims, 9 Drawing Sheets

SYNCHRONIZATION CIRCUIT AND METHOD OF PERFORMING SYNCHRONIZATION

TECHNICAL FIELD

The present invention relates generally to electronic circuits, and in particular to circuits for controlling stepper motors.

BACKGROUND

Stepper motors are widely used in speedometers, tachometers and similar gauges in automobiles and other applications. A stepper motor is one which moves through an integer number of steps as it goes through a revolution. This operation is controlled by the mechanical construction of the motor and its magnets.

In many conventional applications a stepper motor load may be moved to finite number position regardless of the origin position i.e. where the motor starts at. For example, if stepper motor drives a speedometer needle in an automotive application, there is zero position where speedometer readings are zero corresponding to where the speed is zero. In another application if a stepper motor is used to move a printer head, there is an origin position that corresponds to the left side (start position) of a sheet of paper. In these example applications the motor load must be moved to some initial position and uses this is as the origin point.

Figure 1:
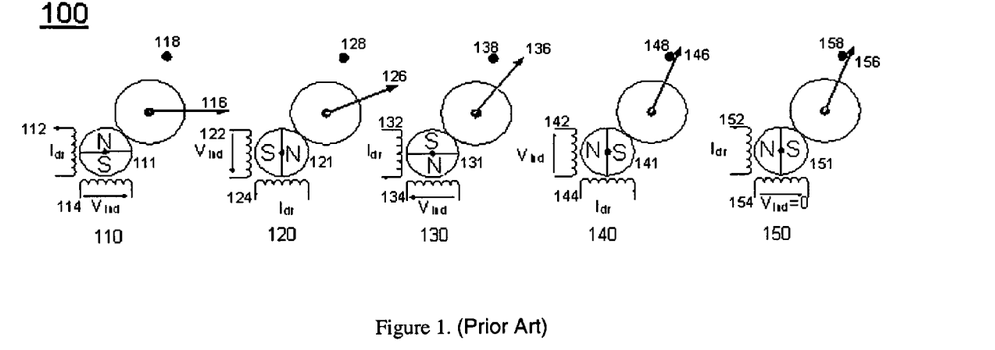
FIG. 1 (Prior Art) illustrates the operation of a conventional stepper motor stop position synchronization solution.

A stepper motor must be synchronized, which means that the position at which a needle (such as a speedometer needle) attached to the motor hits a stop point (for example zero miles per hour in a speedometer) needs to be sensed so the motor recognizes that it is at the zero point. The operation of a conventional stepper motor stop position synchronization solution 100 is shown in FIG. 1. FIG. 1 shows operation 100, with five positions of a rotor magnet and needle.

The first position 110 shows a rotor magnet 111, a first coil 112 through which drive current 'Idr' is passed, a second coil 114 through which a voltage 'Vind' is induced, a needle 116 and a stop point 118. In some embodiments the first and second coils may be orthogonal to each other. In other applications they may be non-orthogonal to each other.

The second position 120 shows a rotor magnet 121 which has rotated from the first position of 110, a first coil 122 through which voltage 'Vind' is induced, a second coil 124 through which a drive current 'Idr' is passed, a needle 126 which has moved from position 116 and a stop point 128.

The third position 130 shows a rotor magnet 131 which has rotated from the position of 120, a first coil 132 through which drive current 'Idr' is passed in a reverse direction, a second coil 134 through which a voltage 'Vind' is induced in a reverse direction, a needle 136 and a stop point 138.

The fourth position 140 shows a rotor magnet 141 which has rotated from the third position of 130, a first coil 142 through which voltage 'Vind' is induced in a reverse direction, a second coil 144 through which a drive current 'Idr' is passed in a reverse direction, a needle 146 which has moved from position 136, and which has reached stop point 148.

The fifth position 150 shows a rotor magnet 151 which has not rotated from the position of 140, a first coil 152 through which drive current Idr is passed, a second coil 154 through which no induced voltage is present (since the rotor magnet 150 has not moved), a needle 156 which has not moved from position 146, as it has stayed against stop point 158.

Figure 2:
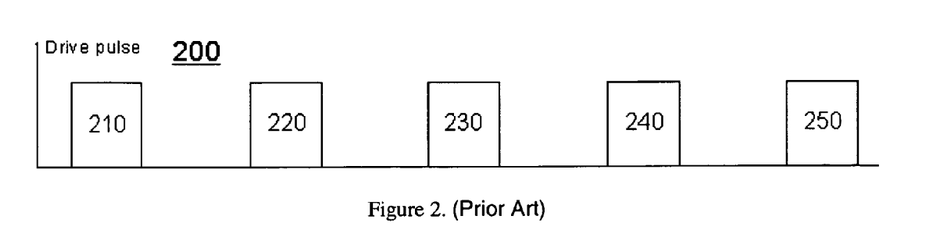
FIG. 2 (Prior Art) illustrates a graph of drive pulses applied in the conventional solution of FIG. 1.

FIG. 2 shows a graph 200 of five drive pulses 210, 220, 230, 240 and 250 corresponding to the first position 110, second position 120, third position 130, fourth position 140 and fifth position 150 of FIG. 1.

Figure 3:
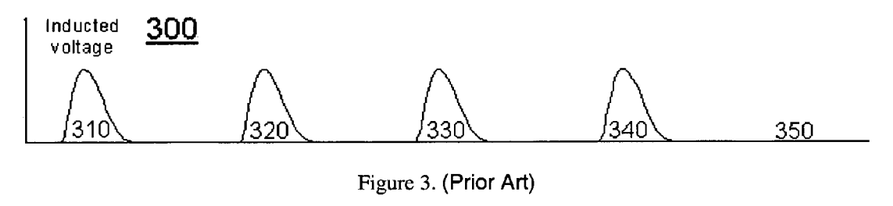
FIG. 3 (Prior Art) illustrates a graph of induced voltages generated in the conventional solution as a result of the drive pulses of FIG. 2.

FIG. 3 shows a graph 300 of induced voltages drive pulses 310, 320, 330, 340 and 350 corresponding to the first position 110, second position 120, third position 130, fourth position 140 and fifth position 150 of FIG. 1. The induced voltage for the fifth position is negligible, as shown by no 'bump' 350 on the graph. The lack of induced voltage at the fifth position is due to the fact the needle 156 is stuck against the stop point 158, hence the rotor 151 cannot turn and no induced voltage is present.

In a conventional solution, the induced voltage of FIG. 3 is monitored, and at point 350 when no induced voltage is present, the solution recognizes that the stop position has been reached. Back electro magnetic force (EMF) is only generated when the motor/needle are moving in the magnetic field because the rotating permanent magnet creates an inducted voltage in both coils. In some conventional motor constructions when the stop point is reached, the motor rotor 'dances' around the stop, so the back EMF signal is reduced in amplitude. In other conventional motor constructions the signal waveform changes after reaching the stop, and the new waveform depends on the stop position relative to the rotor magnet pole position relative to the stator.

The conventional solution for stepper motor stop position synchronization uses a full-step coil drive voltage as shown in FIG. 2. The full step mode refers to an operation mode where only one coil is powered at a time. In this mode the rotor jumps in a 90 degree step (for a two pole motor with a 90 degree step). The jump angle can differ between motor constructions for example when the rotor magnet has more than 2 poles). In full step mode the coil current can have only two values, zero current and full coil current.

Microstepping is a technique where a current is applied to more than one coil to get a partial step actuation. This differs from a full-step method, as in the microstep solution partial steps are applied at a time. In an exemplary microstep mode the coils are powered by two phase-shifted signals that can have more than 2 values. In this microstep mode it is possible that two coils are powered at same time. In this microstep mode each full step is separated by some number of microsteps that allows reduction of vibration and providing smooth rotor rotation.

The conventional full-step solution for stepper motor stop position synchronization operates in the following manner. A full step coil drive voltage is applied to the stepper motor through a powered coil, and a signal is sensed on a second un-powered coil. When the stepper motor needle hits a stop point the needle cannot move further and the back EMF is reduced significantly. When the sensed signal on the un-powered coil indicates that the back EMF has reduced significantly, the needle is considered to have reached the stop point.

Disadvantages of the conventional solution include that it is coarse in finding the zero point. Furthermore since the motor operates in full-step mode with large steps, the motor/needle moves in large jumps and the action of the needle hitting the stop pin can cause wear on the mechanism over time and/or cause the needle to stick against the pin.

Figure 4:
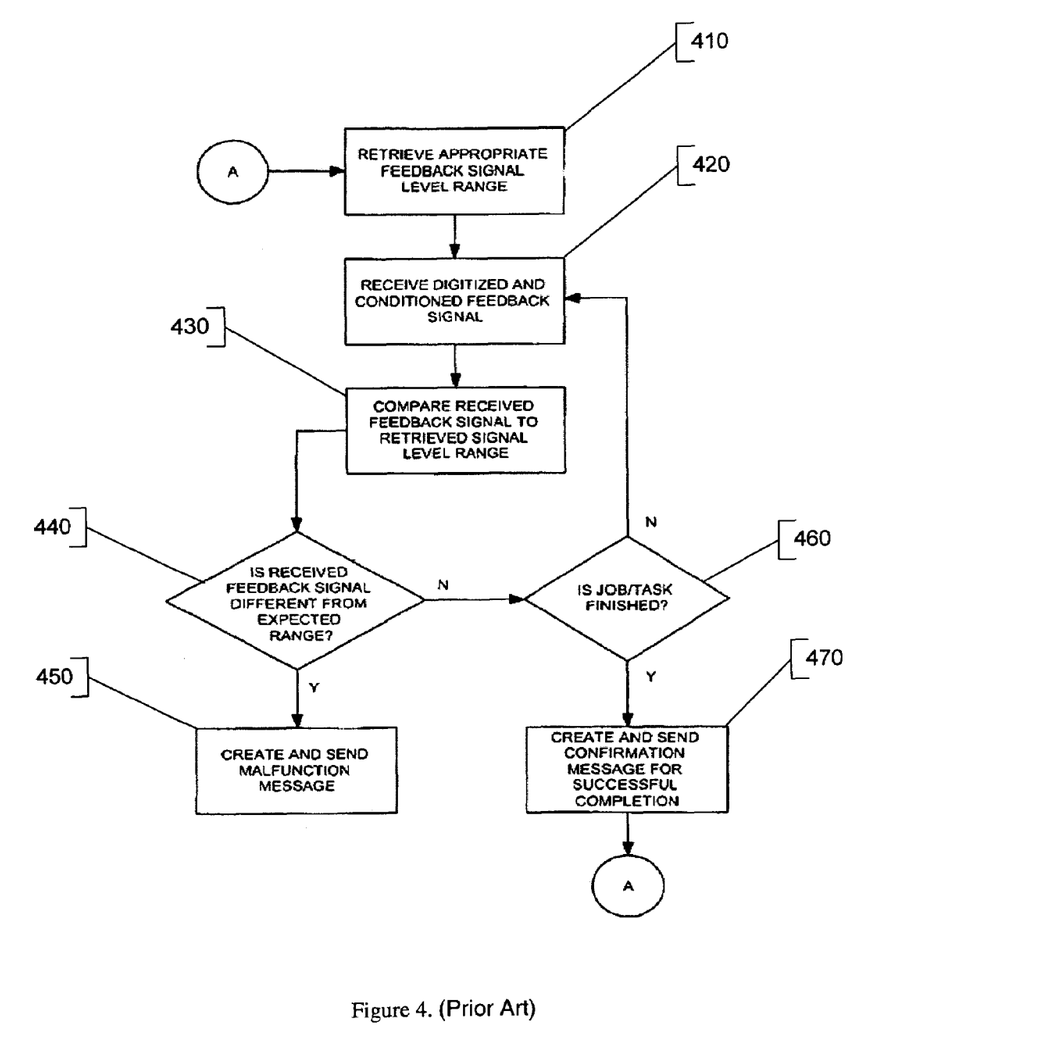
FIG. 4 (Prior Art) illustrates a flowchart showing operation of the conventional solution of FIG. 1.

FIG. 4 illustrates the operation of the conventional solution of FIG. 1. The stall detection begins by retrieving the expected signal levels for a specific motor load and speed values (step 410). Once this is done, the stepper motor executes its task as determined by the microprocessor subsystem. When the coils in the stepper motor are energized by the driver circuit, the current feedback is amplified and digitized (step 420). The received digitized and conditioned feedback signal is then compared to the expected range of feedback signal levels (step 430). After the comparison, a decision is made as to whether the received digitized and conditioned feedback signal was within the expected signal levels (step 440). If the received signal is within the expected range, then a decision is made (step 460) whether the rotation phase is finished. If motor should continue to rotate, then the decision logic returns to step 420 by sampling the coil current again. If the rotation is finished, a confirmation message confirming the completion of the task is sent to the central system (step 470). The controller now knows that the rotation cycle is completed, i.e. that the gauge pointer reached desired position.

A disadvantage of the conventional solution of FIGS. 1 and 4 is that the expected feedback signal values must be collected for different motor speeds and load values, requiring the control firmware calibration for each speed/load profile. Moreover, this algorithm is difficult to adapt when motor rotor accelerates/decelerates during operation.

Another conventional sensor-less stop synchronization solution described in U.S. Pat. No. 6,667,595 analyzes the voltage back-EMF signal timing parameters rather the doing a simple amplitude analysis. In the method of U.S. Pat. No. 6,667,595 the current ramp slope in the full step mode is analyzed, and the stop point is characterized by increasing coil current setup time.

Another conventional sensor-less stop synchronization solution is described in U.S. Pat. No. 6,815,923 which uses the coil drive current feedback signal and compares the signal with some predefined lookup table for a given motor speed and load. When a stop is reached, the current waveform changes and a comparator detects the rotor stalling. In spite of the fact that microstep mode synchronization was not considered in this patent, it can be used here. A disadvantage of the solution of U.S. Pat. No. 6,815,923 is that for correct operation the appropriate feedback signal tables for different speed and load values should be collected and stored in the microcontroller memory, which makes the solution motor and load dependent, and tuning may be required after changing the motor.

It would be desirable to provide stop synchronization in the microstep mode that allows greater synchronization accuracy and reduces the noise and vibration during synchronization by using microstep mode instead full step mode.

DETAILED DESCRIPTION

An embodiment is described of an improved sensor-less method and circuit for stepper motor stop synchronization. The improved synchronization solution for stepper motors allows for elimination of noise/vibration during full-step synchronization by using a microstep operation to determine changes in back EMF during synchronization. The improved sensor-less method and circuits and signal processing methods are in one embodiment optimized for low-power, direct microcontroller driven stepper motors for gauges. In other embodiments the improved sensor-less method and circuit can be used for other types of stepper motors.

Unlike conventional solutions the improved solution senses the coil current during microstep operation and uses an adaptive, learning-free algorithm to determining the rotor stall. Learning-free means the solution does not require additional learning steps to collect reference waveforms for given speed/load values. In the conventional solution the reference waveforms must be collected and stored in memory and compared to measured waveforms to check when a stop is reached.

In the improved microstep solution, when the pointer reaches a stop point, a ripple or 'dancing' waveform is seen on the induced voltage output. The current waveform changes when the pointer reaches a stop due to loss of synchronization between the rotor and the rotating magnetic field vector, hence causing the ripples. These ripples can be separated and used to detect the reaching of a stop point. The improved solution can detect ripple for any motor type, and does not have to be customized to each motor, unlike the conventional solution which must be customized to each motor in a learning step.

Figure 5:
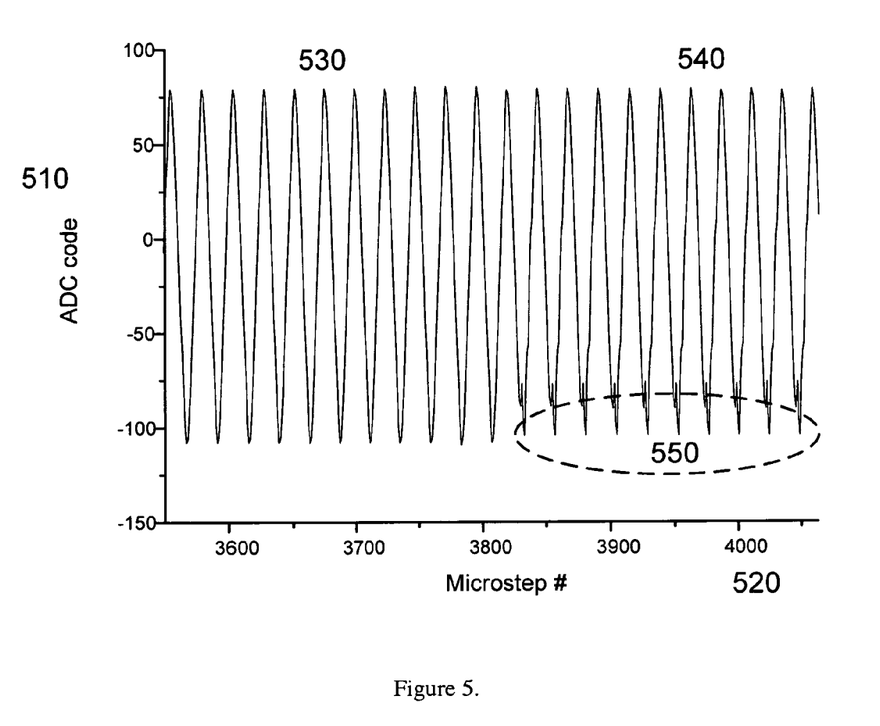
FIG. 5 illustrates a current waveform when a stop point is reached showing ripple on the waveform as a result of the stop.

FIG. 5 shows the coil current waveform at the step motor with the Y-axis 510 showing analog to digital converter (ADC) counts, and the X-axis 520 showing the microstep number in the range from 3550 to 4050, with steps shown at 3600, 3700, 3800, 3900, and 4000. In FIG. 5 the stop has been reached around microstep number 3820. A first section of the graph 530 shows a sinusoidal current waveform where the needle and rotor are moving, and a second section of the graph 540 shows a small noise on the waveform (circled as 550) where the needle and rotor are not moving, visible as 'dancing' or ripple on the waveform.

Figure 6:
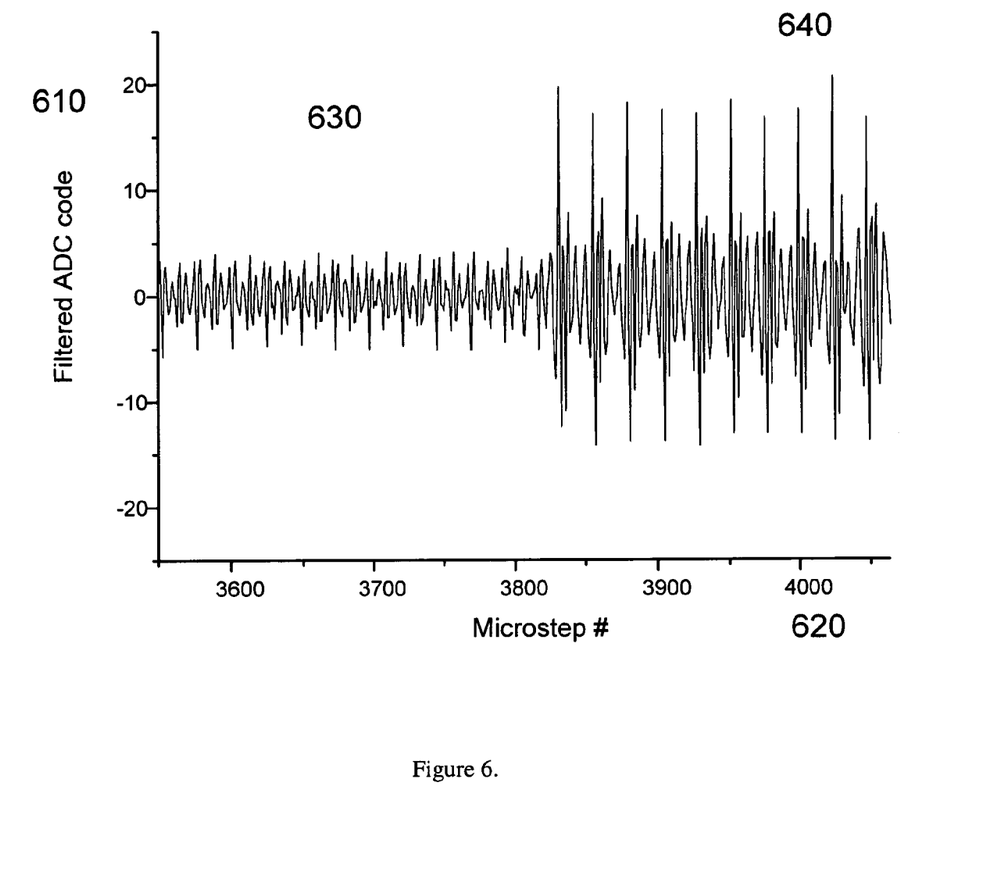
FIG. 6 illustrates a filtered current waveform when a stop point is reached emphasizing ripple on the waveform as a result of the stop.
Figure 7:
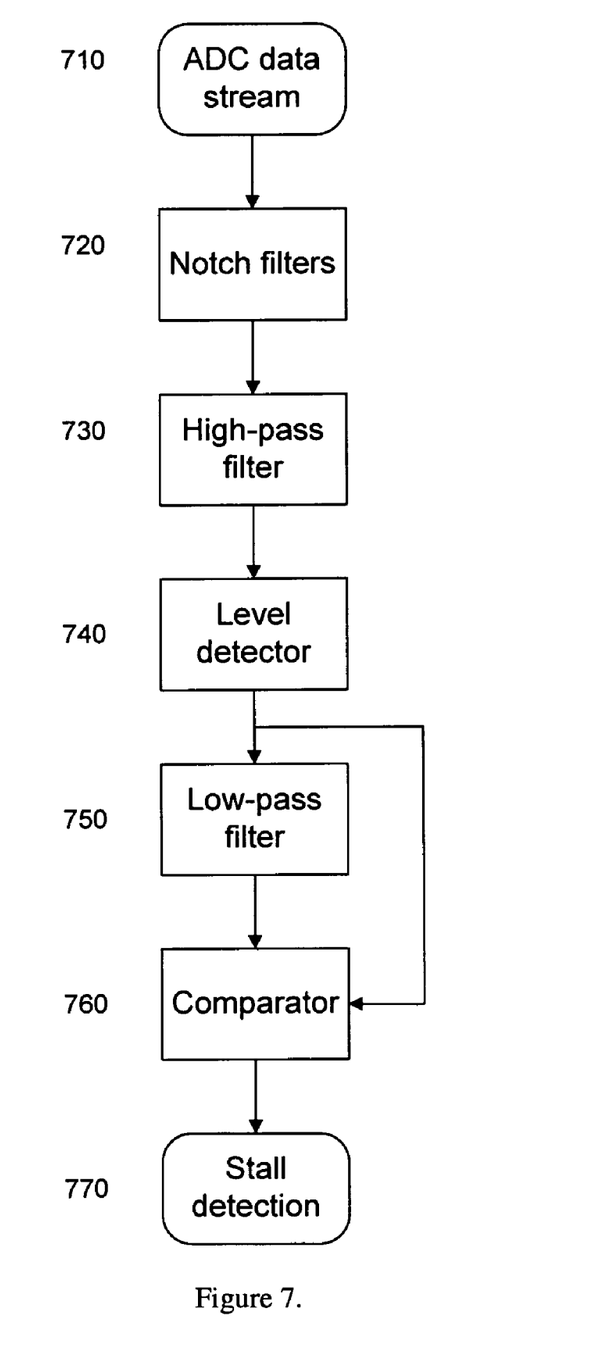
FIG. 7 illustrates a flowchart showing operation of the improved sensor-less method for stepper motor stop synchronization.

To separate ripples from the current waveform the waveform is digitized using an analog to digital converter (ADC) and samples are processed using digital filtering. The result of this filtering is shown on FIG. 6. FIG. 6 shows the filtered coil current waveform 600 at a step motor with the Y-axis 610 showing filtered values and the X-axis 620 showing the microstep number. FIG. 6 shows that for this embodiment the current ripple amplitude approximately doubles when the stop has been reached. This increase in the ripple amplitude can be identified by decision logic. In one embodiment the decision logic may be implemented as a simple threshold comparator, which compares the instant ripples signal with filtered values. When a stop is detected, the ripple level increases sharply. The low pass filter does not detect this sharp increasing, the comparator detects the rotor stall. Note: the low-pass filter detects a slow change in ripple level during phases where the rotation speed accelerates and decelerates. FIG. 7 illustrates a filtering scheme 700 for a current waveform signal processing. The ADC data stream 710 is passed to notch filters 720 for removing the primary and any higher harmonics from the input signal. A high-pass filter 730 removes possible DC offset from the data stream. The output 730 of the high-pass filter is passed to level detector 740 which estimates the ripples value. This is simple absolute value calculation. The high-pass filter 730 outputs signed output data and the level detector calculates the signal absolute value by removing the sign. This acts as a rectifier function, implemented in firmware. In other embodiments software or hardware implementations could be used.

The output of the level detector 740 is passed to low-pass filter 750 which tracks slow changes in the ripples level caused by the possible rotation speed changes during acceleration/deceleration of the motor drive phases. The comparator 760 compares the actual ripples level with the slow-changed low-pass filter "baseline" level and signals the stall detection 770 when the ripple level changes enough to indicate a stall. In one embodiment the step of indicating stall comprises comparing the change in the level of ripple with a threshold value and if the threshold value is exceeded, signaling that a stall has occurred. The filtering scheme described here is one possible embodiment, other filtering schemes can be used also to achieve the same result.

In the solution described the ADC sample time is synchronized with a coil current update value during microstep operation. This synchronization prevents possible aliasing problems and provides a constant sample frequency relative to rotation speed (the ADC conversion is triggered the same number of times regardless of rotation speed). The motor coil is driven in the microstep operation by the digitized sinusoidal signal. One sinusoidal period is divided into a number of microsteps. Each microstep corresponds to one coil drive signal value. The ADC samples synchronously with coil drive signal updates.

Figure 8:
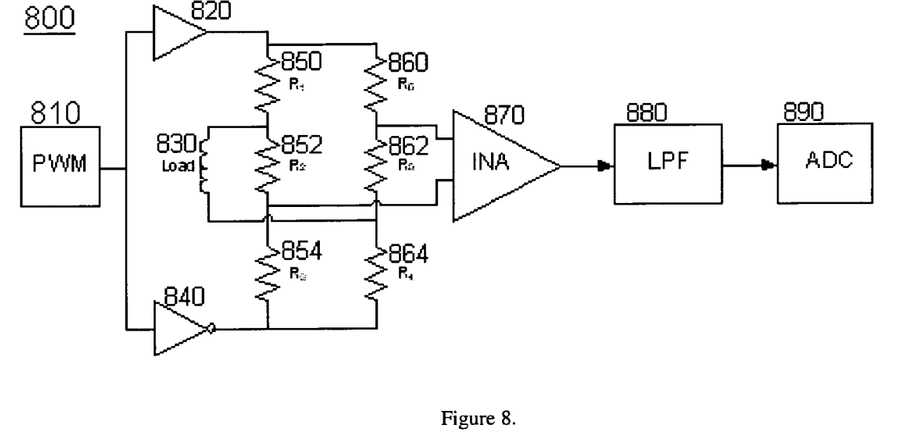
FIG. 8 illustrates a first improved circuit for stepper motor stop synchronization.

FIG. 8 shows a first improved circuit 800 for stepper motor stop synchronization using a resistive bridge for coil current separation. The circuit 800 comprises a pulse width modulated source 810 coupled to inputs of a buffer 820 and to an inverter 840. The output of buffer 820 is coupled to the top of a first resistor tree and to the top of a second resistor tree. The first resistor tree comprises resistor 850 coupled in series with resistor 852, coupled in series with resistor 854. A first (top) side of resistor 850 is coupled to the output of buffer 820. A second (bottom) side of resistor 854 is coupled to an output of inverter 840. The second resistor tree comprises resistor 860 coupled in series with resistor 862, coupled in series with resistor 864. A first (top) side of resistor 860 is coupled to the output of buffer 820. A second (bottom) side of resistor 864 is coupled to an output of inverter 840. A load 830 (typically a motor coil to be driven) has a first side coupled to a node between resistor 850 and resistor 852, and has a second side coupled between resistor 862 and resistor 864. An instrumentation amplifier (INA) 870 has a first input coupled between resistor 852 and resistor 854, and has a second input coupled between resistor 860 and resistor 862. An output of the instrumentation amplifier 870 is coupled to a low pass filter (LPF) 880, which has an output coupled to analog to digital converter (ADC) 890.

The resistive bridge suppresses a high-voltage common mode signal from a relatively small differential current sense resistor signal. This bridge allows the use of instrumentation amplifiers with a relatively small common mode reduction ratio at the pulse width modulated (PWM) signal frequency. An example of suitable instrumentation amplifiers is the amplifiers built into a system on a chip microcontroller. In one embodiment the resistor values for the bridge may in one embodiment be selected where R850 is equal to R864, R852 is equal to R862, R854 is equal to R860, and R854 is equal to the sum of R850 and R852. In this case the instrumentation amplifier input voltage is proportional to the 830 load current and has little dependence from the PWM drive signal.

In one embodiment the improved solution may be used to control low-power gauge motors with bipolar drive circuits. In this embodiment an H-bridge power scheme may be used for driving the motor coils. An H-bridge is a configuration of control switches that allows operation of a bidirectional coil current at single polarity power supply. In another embodiment, the improved stop detection solution can be used for unipolar motor operation, where single current polarity drivers may be used instead of bipolar drivers.

Figure 9:
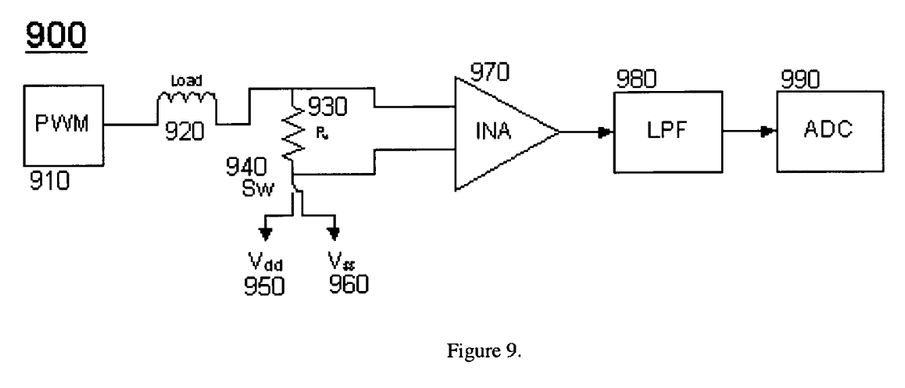
FIG. 9 illustrates a second improved circuit for stepper motor stop synchronization.

FIG. 9 shows a second improved circuit 900 for a stepper motor stop synchronization using a switching-cap instrumentation amplifier. Circuit 900 comprises a pulse width modulated source 910 coupled in series to load 920 (typically the motor to be driven), where the load 920 is further coupled to a first side of resistor 930 and to a first input of instrumentation amplifier (INA) 970. A second side of resistor 930 is coupled to a second input of instrumentation amplifier 970 and to a switch 940. The switch 940 is configured to switch between a first voltage (vdd) 950 and a second voltage (vss) 960. The instrumentation amplifier 970 has an output coupled to low pass filter (LPF) 980, which has an output coupled to analog to digital converter (ADC) 990. In the circuit shown above, the PWM driver minimum voltage should be approximately equal to VSS, and the PWM driver output maximum voltage should be approximately equal to VDD.

Advantages of the improved solution include that it allows smooth microstep rotation during a motor synchronization process, and is well suited to implementation in microcontroller and programmable logic devices having built-in instrumentation amplifiers. Furthermore, the improved solution has no learning requirements so can be used with different motors without firmware change.

Embodiments of the present invention are well suited to performing various other steps or variations of the steps recited herein, and in a sequence other than that depicted and/or described herein. In one embodiment, such a process is carried out by processors and other electrical and electronic components, e.g., executing computer readable and computer executable instructions comprising code contained in a computer usable medium.

For purposes of clarity, many of the details of the improved solution and the methods of designing and manufacturing the same that are widely known and are not relevant to the present invention have been omitted from the following description.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A synchronization circuit, comprising:
   a pulse width modulated (PWM) input signal;
   an inverter having an input coupled to the pulse width modulated input signal;
   a first resistor tree coupled to an output of the inverter;
   an instrumentation amplifier having an input coupled to the first resistor tree,
      wherein the instrumentation amplifier is configured to measure a level of ripple in the PWM input signal;
   a filter coupled to an output of the instrumentation amplifier,
      wherein the filter is configured to detect a change in the measured level of the ripple, and
      wherein a motor stall is determined when the change in the measured level of the ripple exceeds a predetermined threshold; and
   an analog to digital converter coupled to an output of the filter.

2. The circuit of claim 1, further comprising a second resistor tree coupled to the output of the inverter and to the instrumentation amplifier.

3. The circuit of claim 2, further comprising a load coupled between the first resistor tree and the second resistor tree.

4. The circuit of claim 3, further comprising a buffer coupled between the pulse width modulated input signal and the first resistor tree and second resistor tree.

5. The circuit of claim 1 wherein the filter is configurable to track changes in a ripple level in the pulse width modulated input signal.

6. The circuit of claim 5 wherein the filter comprises a low pass filter.

7. A synchronization circuit, comprising:
   a pulse width modulated (PWM) input signal;
   a load coupled in series with the pulse width modulated input signal;
   an instrumentation amplifier having a first input coupled to the load,
      wherein the instrumentation amplifier is configured to measure a level of ripple in the PWM input signal;
   a resistor coupled between the first input and a second input of the instrumentation amplifier;
   a switch coupled to the second input of the instrumentation amplifier,
      wherein the switch is configured to select between a first voltage and a second voltage;
   a filter coupled to an output of the instrumentation amplifier,
      wherein the filter is configured to detect a change in the measured level of the ripple, and
      wherein a motor stall is determined when the change in the measured level of the ripple exceeds a predetermined threshold; and
   an analog to digital converter coupled to an output of the filter.

8. The circuit of claim 7 wherein the filter is configurable to track changes in a ripple level in the pulse width modulated input signal.

9. The circuit of claim 7 wherein the filter comprises a low pass filter.

10. A method of performing synchronization, comprising:
    sampling an analog signal and forming a digital data stream representing the analog signal;
    filtering the digital data stream to remove harmonics;
    measuring an approximate level of ripple in the digital data stream;
    detecting a change in the measured level of ripple; and
    based upon the change in the measured level of ripple, determining if a motor stall has occurred.

11. The method of claim 10, further comprising the step of filtering the digital data stream with a high pass filter to remove DC offset.

12. The method of claim 10, wherein the step of filtering the digital data stream to remove harmonics comprises applying a notch filter to the digital data stream.

13. The method of claim 10 wherein the step of measuring an approximate level of ripple comprises passing the digital data stream to a level detector.

14. The method of claim 10 wherein the step of detecting a change in the measured level of ripple comprises comparing the measured ripple level with a baseline ripple level.

15. The method of claim 10 wherein the step of determining if a stall has occurred comprises comparing the change in the measured level of ripple with a threshold value and if the threshold value is exceeded, signaling that a stall has occurred.

16. A synchronization circuit for a motor, comprising:
    means for sampling an analog signal and forming a digital data stream representing the analog signal;
    means for filtering the digital data stream;
    means for measuring a level of ripple in the digital data stream;
    means for detecting a change in the measured level of ripple in the digital data stream; and
    means for determining if the motor has stalled based upon the change detected in the measured level of ripple.

17. The circuit of claim 16 wherein the means for filtering the digital data stream comprises a notch filter to remove harmonics.

18. The circuit of claim 17 wherein the means for filtering the digital data stream further comprises a high pass filter to remove a DC offset in the digital data stream.

19. The circuit of claim 16 wherein the means for detecting a change in the measured level of ripple in the digital data stream comprises a level detector through which the digital data stream is passed.

20. The circuit of claim 19 wherein the means for detecting a change in the measured level of ripple further comprises a low pass filter having an input coupled to an output of the level detector to track changes in the level of ripple caused by rotation speed changes of the motor.

21. The circuit of claim 20 wherein the means for detecting a change in the measured level of ripple further comprises a comparator having a first input coupled to an output of the low pass filter and a second input coupled to the output of the level detector to compare the ripple level out of the level detector with a filtered baseline level out of the low pass filter.

* * * * *